Patented Apr. 21, 1925.

1,534,752

UNITED STATES PATENT OFFICE.

PHILIP B. WATSON, OF FLUSHING, NEW YORK, ASSIGNOR TO CARBIDE AND CARBON CHEMICALS CORPORATION, A CORPORATION OF NEW YORK.

PRODUCTION OF GLYCOL ESTERS.

No Drawing.      Application filed May 21, 1920. Serial No. 383,311.

*To all whom it may concern:*

Be it known that I, PHILIP B. WATSON, a citizen of the United States, residing at Flushing, in the county of Queens and State of New York, have invented certain new and useful Improvements in the Production of Glycol Esters, of which the following is a specification.

This invention relates to the production of glycol esters; and it comprises a method of obtaining esters from glycols wherein such a glycol is boiled for a time with an organic acid under conditions permitting escape of water vapor but adapted to condense and return higher boiling materials; as in boiling acetic acid, which may be more or less dilute commercial acid, with a glycol, such as ethylene glycol, under a partial reflux with the vapor exit at 100° C. or thereabouts; all as more fully hereinafter set forth and as claimed.

The esters of the various glycols, such as ethylene glycol, propylene glycol, etc., are useful as solvents and for other purposes and it is a purpose of the present invention to provide a simple, ready and economical method of obtaining them. In esterifying the hydroxyl groups of alcohols with carboxylic acids, as is well known, the action goes on till a certain amount of ester is formed and a certain amount of water is produced at the expense of the hydroxyl groups of the alcohol and of the acid; until a certain equilibrium is established between unchanged acid and alcohol on the one hand and the ester and the water produced on the other.

In order to obtain good yields of any ester it is usually considered necessary to employ materials as nearly anhydrous as possible; and, generally, as necessary to use either the acid of the alcohol in tolerably large excess. Also, it is usually considered desirable to use catalysts such as HCl, ZnCl$_2$, H$_2$SO$_4$, etc., to accelerate ester formation. These accepted principles of esterification are however difficult and expensive of application in making glycol esters. The commercial glycols, such as ethylene glycol, propylene glycol and the butylene glycols, are quite hygroscopic materials, readily taking up water and holding it rather fixedly against removal, while in dehydration there is always the risk of polymerization with formation of polyglycols. The commercial acids, also, are in general much cheaper in hydrated form than in anhydrous. Weak acetic acid, is, for example, much cheaper per unit of real acid than glacial; and the latter is, again, very much cheaper than acetic anhydride. The price of concentrated formic acid is almost prohibitive as compared with the price of more dilute acid. Again, the presence of catalytics, such as sulfuric acid, HCl, ZnCl$_2$ is often undesirable because of their effect on the glycol.

In the present invention I have devised a cheap, simple and ready method of making glycol esters in which the presence of water or moisture in the materials becomes unimportant since it, together with such water as is formed by the reaction itself, is simply boiled out of the system. This is practicable since the glycols and their esters are all quite high boiling and most of the acids desired for use in esterification also have a boiling point higher than that of water. In my method of operation I simply admix the glycol, which may or may not contain water, with the desired amount of the desired organic acid, such as formic or acetic acid, which may be in dilute form, and boil the two together under a partial refluxing arrangement of such a type as to deliver vapors to exit at a temperature around 100°. C. Under these conditions the water, both that originally present in the materials and that formed in esterification, is removed from the system leaving behind the other bodies. Instead of the glycol and acid becoming more dilute as esterification goes on they become more concentrated. Any glycol, acid and ester which may volatilize as the temperature of the reaction mixture rises are condensed and returned.

In making ethylene monacetate, for example, commercial ethylene glycol may be admixed with a little more than the calculated quantity of commercial 28 per cent acetic acid and acid and glycol boiled together under a partial reflux, to allow water vapors to escape while holding back the acid and the glycol. The progress of the esterification is followed by analysis. Since the acidity of the mixture lessens in accordance with the disappearance of acid by combination with glycol, analysis may be by a simple titration of a removed sample by means of alkali solution. When the acidity has decreased to the required extent, refluxing is discontinued and the residual acetic acid is removed. The simplest expedient is to boil it off. The ethylene monoacetate may then, in its turn, be distilled over. In the described operation no accelerating catalyst such as HCl,H₂SO₄ etc. is necessary, and though such a catalyst may be used, except in special cases I usually prefer to dispense with it. In making ethylene diacetate the procedure is exactly the same except of course that a larger quantity of acetic acid is employed. In either case all the acid may be added at once or addition may be portionwise. The production of either of the glycol acetines (acetates) may be readily made continuous by the use of a column still, the desired proportions of acid and glycol being supplied at a point below the vapor exit and above the liquid exit. The acetine produced is removed at the base of the still and the water removed at the vapor outlet. The stated procedure may be employed in making the corresponding formate testers by substituting commercial formic acid for commercial acetic acid. Butyric, valeric, oleic, tartaric, oxalic, etc. esters may be made in the same way, substituting the appropriate acid for the acetic acid in the example given. In the case of difficultly volatile acids, it is in general advisable after heating the glycol and the acid together with removal of water in the way described until analysis shows reduction in the amount of free acid has gone as far as is desired, to stop the heating and remove the excess of acid in some way other than by distillation, as by washing with a little alkali solution.

In making these esters while sulfuric acid or HCl in small amounts may, as stated, be used as a catalyzer, such a catalyzer is not necessary and its action often introduces some complications. In the case of HCl more or less chlorhydrin or other chlorinated compound is formed and for some purposes the presence of these chlorinated bodies is undesirable as interfering with the specific solvent powers of the esters to be made. It is sometimes difficult to get rid of these chlorinated bodies. Sulfuric acid has a tendency to polymerize the glycols with production of high boiling polyglycols in greater or less amount; and these produce high boiling esters which are frequently quite undesirable. Zinc chlorid, calcium chlorid and other dehydrating ester-forming catalysts have the same action. Except in special cases therefore I prefer not to use these catalysts.

The described methods are applicable not only to the pure glycols but to various mixtures of the same which are now commercial, such as the mixed propylene and ethylene glycols made from the olefins of oil gas. For many purposes the mixed esters made from these glycol mixtures are as applicable as pure esters made from pure glycols.

In one typical esterification under the present invention, a commercial glycol preparation made from oil gas and containing ethylene and propylene glycols in approximately equal proportions as well as some water was mixed with commercial 28 per cent acetic acid in the amount corresponding to the monacetate with 5 or 10 per cent excess. This mixture was brought to a boil with a partial refluxing of vapors evolved in ebullition, vapors being only allowed to escape after cooling down to 100 to 105° C. The initial boiling point of the mixture was 130° C. (temperature of the liquid) but after some hours digestion the boiling point went to 164° C. and analysis showed that enough acid had disappeared to form the monacetate. The refluxing was now discontinued and the uncombined acid distilled over and condensed, the condensate being reserved for use with another charge. The monoacetate was now distilled over in turn, giving a clear white anhydrous preparation suitable for direct use for solvent and other purposes. In making the diacetate the operation was the same save that twice as much acid was used.

In making formates, valerates, etc. the procedure is the same. In making oleates and stearates, when analysis shows disappearance of the proper amount of acidity, heating is discontinued, the liquid mass cooled and washed with a little weak caustic soda solution.

The various esters of the glycols with organic acids, and particularly the acetates of ethylene and propylene glycols, are excellent solvents for paint and varnish materials, such as copals, shellac, pyroxylin, cellulose acetate, dyestuffs, such as the nigrosine colors, etc. They have a boiling point in the neighborhood of 180° C. and a medium volatility. The acetates are also desirable as paint and varnish removers, either alone or admixed with other solvents, such as benzol, toluol, etc. They may be admixed with the usual thickeners, wax, paraffin, etc., for this purpose; or, and advantageously with a little polyglycol acetate. For example, in making acetates from oil glycols for paint removing purposes, the operation previously described may be carried out in the presence of a little sulfuric acid, which will form some polyglycols or the glycol may be previously dehydrated and partially polymerized by heat. By themselves the acetates are somewhat too thin to remain on vertical or inclined surfaces without flowing; but in the presence of some polyglycol acetates they are rendered fairly viscid or thick without forfeiting solvent power for paint and varnish as is the case where wax is used for thickening.

A simple and quick way of making a paint remover composition is to admix commercial oil gas glycols with acetic acid in the right amount to make a monoacetate or diacetate, as the case may be, add a little dehydrating accelerating catalyst such as sulfuric acid or zinc chlorid, and boil in the way described. After the glycol is esterified, the residual acetic acid is boiled off, unless an acid remover is desired, in which case it may be simply allowed to remain. The sulfuric acid or zinc chlorid, as the case may be, not only accelerates the esterification but also forms polyglycols by polymerization of the glycol, the extent to which this action takes place depending upon the amount of catalyst and the length of heating. The polyglycols themselves form acetates; and as these polyglycol acetates are thick viscous bodies the product of esterification is not so mobile as the glycol acetates alone. By proper control of conditions an esterification product can be obtained as thick and as little mobile as may be desired for paint remover purposes. Where a partially polymerized product is desired, as in this instance, it is usually better not to distil over the product after the esterification, giving it such purification or bleaching as may be desired in other ways; as by treatment with bone charcoal or decolorizing carbon. In using sulfuric acid and making an undistilled product, the acid may be removed by addition of a little acetate of soda or acetate of lime. This may be done prior to the removal of the excess of reaction acid, where such excess is removed. Zinc chlorid may be simply allowed to remain, or converted into zinc acetate and sodium chlorid by an addition of sodium acetate.

The thickened paint and varnish removers so made can be made of almost any consistency desired without forfeiting their solvent powers; the polyglycol esters being themselves good solvents. They may be mixed, if desired, with other solvents customarily used in removers, such as benzol, toluol, alcohol, etc. Unless unduly thinned by admixtures the use of the customary thickeners, such as wax, casein, etc., is rarely desirable although it may be resorted to. Unlike the polyglycol esters, these additions usually cut down materially the solvent power on paint and varnish. Separately made polyglycol esters may be incorporated with acetate, etc., made as described but as a rule it is more convenient to make them in connection with the regular esterification.

The glycol oleates, palmitates, stearates, butyrates, etc., are soluble in fats and oils and miscible with many waxes and materials of like nature; and may be used in making various toilet compositions such as "creams". They are of nutritive nature and may be used in edible compositions.

What I claim is:—

1. The process of making glycol esters which comprises boiling a glycol with a carboxyl acid having a boiling point materially above the boiling point of water under partial reflux conditions, the vapor exit being maintained around 100° C. whereby the water formed in the reaction can escape while the glycol, acid and ester are retained.

2. The process of making glycol esters which comprises boiling a glycol with a volatile carboxyl acid having a boiling point materially above the boiling point of water under partial reflux conditions arranged to permit exit of vapors at about 100° C. until the desired amount of such acid has disappeared by combination with the glycol, distilling off the residual acid and then distilling over the ester formed.

3. The process of making glycol acetates which comprises boiling glycol with acetic acid under partial refluxing conditions adapted to permit escape of water vapors, such vapors being permitted to escape at a temperature corresponding to the boiling point of water at the pressure prevailing, while holding back glycol and acid until the desired amount of combination has taken place, distilling off the excess of acid and then distilling over the acetate produced.

In testimony whereof, I affix my signature.

PHILIP B. WATSON.